(12) United States Patent
Kim et al.

(10) Patent No.: US 11,417,321 B2
(45) Date of Patent: Aug. 16, 2022

(54) CONTROLLING VOICE RECOGNITION SENSITIVITY FOR VOICE RECOGNITION

(71) Applicant: LG ELECTRONICS INC., Seoul (KR)

(72) Inventors: Sang Won Kim, Seoul (KR); Joonbeom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 208 days.

(21) Appl. No.: 16/858,028

(22) Filed: Apr. 24, 2020

(65) Prior Publication Data

US 2021/0210075 A1 Jul. 8, 2021

(30) Foreign Application Priority Data

Jan. 2, 2020 (KR) .......................... 10-2020-0000308

(51) Int. Cl.
*G10L 15/183* (2013.01)
*D06F 34/28* (2020.01)
(Continued)

(52) U.S. Cl.
CPC ............ *G10L 15/183* (2013.01); *D06F 34/28* (2020.02); *G10L 15/26* (2013.01); *G10L 2015/088* (2013.01)

(58) Field of Classification Search
CPC . G10L 15/183; G10L 15/26; G10L 2015/088; D06F 34/28
See application file for complete search history.

(56) References Cited

U.S. PATENT DOCUMENTS 10,652,655 B1 * 5/2020 Weldemariam ...... G10L 21/0316
2015/0248885 A1 * 9/2015 Koulomzin ............. G10L 15/08
704/251

(Continued)

FOREIGN PATENT DOCUMENTS

CN 110500721 A * 11/2019
KR 10-2004-0050765 A 6/2004
KR 10-1991632 B1 9/2019

OTHER PUBLICATIONS

CN110500721A-translation (Year: 2019).*

*Primary Examiner* — Michelle M Koeth
*Assistant Examiner* — Darioush Agahi
(74) *Attorney, Agent, or Firm* — Birch, Stewart, Kolasch & Birch, LLP

(57) ABSTRACT

A device for changing a speech recognition sensitivity for speech recognition can include a memory and a processor configured to obtain a first plurality of speech data input at different times, apply a pre-trained speech recognition model to the first plurality of speech data at a plurality of different speech recognition sensitivities, obtain a first speech recognition sensitivity from among the plurality of different speech recognition sensitivities based on the pre-trained speech recognition model and the plurality of different speech recognition sensitivities, the first speech recognition sensitivity corresponding to an optimal speech recognition sensitivity at which a speech recognition success rate of the speech recognition model satisfies a set first recognition success rate criterion, and change a setting of the speech recognition sensitivity based on the first speech recognition sensitivity obtained from among the plurality of different speech recognition sensitivities.

17 Claims, 6 Drawing Sheets

(51) Int. Cl.
    *G10L 15/26*    (2006.01)
    *G10L 15/08*    (2006.01)

(56) References Cited

U.S. PATENT DOCUMENTS

2018/0158449 A1* 6/2018 Tang ........................ G10L 13/04
2021/0043204 A1* 2/2021 Hwang ................... G10L 25/84
2021/0158803 A1* 5/2021 Knudson ................. G10L 15/22

* cited by examiner

CONTROLLING VOICE RECOGNITION SENSITIVITY FOR VOICE RECOGNITION

CROSS-REFERENCE TO RELATED APPLICATION

This present application claims benefit of priority to Korean Patent Application No. 10-2020-0000308, entitled "CONTROLLING VOICE RECOGNITION SENSITIVITY FOR VOICE RECOGNITION," filed in the Republic of Korea on Jan. 2, 2020, the entirety of which is incorporated herein by reference.

BACKGROUND

1. Technical Field

The present disclosure relates to a technique for changing a speech recognition sensitivity for speech recognition.

2. Description of Related Art

A washing machine corresponds to an apparatus configured to wash laundry. The washing machine may be operated by automatically determining a washing process (for example, an operation course for the laundry, such as wool washing, blanket washing, general washing, or the like, an amount of water, the number of times of rinsing, or the like) based on the amount (or volume, weight) of the laundry when the laundry is loaded and a washing start instruction is input. Alternatively, when a user inputs a washing process, the washing machine may operate according to the input washing process.

Modern washing machines may provide convenience by operating based on speech recognition. However, the speech recognition of these washing machines remains constant without changing a speech recognition sensitivity for the speech recognition. Therefore, when a volume (or pronunciation) of speech uttered by the user changes, or when surrounding noise occurs, the washing machine may be more likely to misrecognize the speech uttered by the user or misrecognize the surrounding noise as speech uttered by the user.

Related Art 1 (Korean Patent Registration No. 10-1991632) discloses a washing machine operating based on speech recognition using artificial intelligence. In addition, Related Art 2 (Korean Patent Application Publication No. 10-2004-0050765) discloses a speech recognition method for a washing machine in which is capable of speech recognition, even if noise occurs in the washing machine, by performing a process of removing noise from the input speech signal.

Related Art 1 may effectively remove contaminants by changing the washing course based on information on fabrics and contaminants extracted from the speech signal. Related Art 2 may recognize the speech without being affected by surrounding noise.

However, Related Arts 1 and 2 do not consider misrecognition of speech or a speech recognition rate for recognizing speech. Thus, Related Arts 1 and 2 have limitations in setting an optimal speech recognition sensitivity based on the misrecognition of speech or the speech recognition rate.

Accordingly, there is a need for a technique capable of changing the speech recognition sensitivity based on the misrecognition of speech or the speech recognition rate for recognizing speech.

SUMMARY OF THE INVENTION

The present disclosure is directed to increasing a speech recognition rate within a range in which speech uttered by a user is not misrecognized, by obtaining an optimal speech recognition sensitivity at a plurality of different speech recognition sensitivities based on a speech recognition success rate for a plurality of speech data and changing a setting of the speech recognition sensitivity for speech recognition based on the optimal speech recognition sensitivity.

The present disclosure is further directed to ensuring that a user is not disturbed due to misrecognized results, by differently setting volume levels of confirmation sounds corresponding to the recognition of a wake-up word in a plurality of speech data based on matching scores of the wake-up word, and thereby when a keyword based on noise data (for example, TV sound data, music sound data) in speech data is misrecognized as the wake-up word, setting the volume level of the confirmation sound to be relatively low.

The present disclosure is still further directed to enabling a user to conveniently operate a product though speech, even if the product (for example, a washing machine) including a device for changing a speech recognition sensitivity for speech recognition is shared and used, by customizing the speech recognition sensitivity for speech recognition for each user.

According to one embodiment of the present disclosure, a device for changing a speech recognition sensitivity for speech recognition may include a processor, and a memory operatively coupled to the processor and configured to store at least one code executable by the processor, in which the memory stores codes configured to, when executed by the processor, cause the processor to: obtain a first plurality of speech data input at different times; apply a pre-trained speech recognition model to the first plurality of speech data at a plurality of different speech recognition sensitivities and obtain a first speech recognition sensitivity from among the plurality of different speech recognition sensitivities based on the pre-trained speech recognition model and the plurality of different speech recognition sensitivities, the first speech recognition sensitivity corresponding to an optimal speech recognition sensitivity at which a speech recognition success rate of the speech recognition model satisfies a set first recognition success rate criterion; and change a setting of the speech recognition sensitivity based on the first speech recognition sensitivity obtained from among the plurality of different speech recognition sensitivities.

The device may be a washing machine for washing clothes or a dryer for drying clothes.

The codes may be configured to, when executed by the processor, further cause the processor to obtain the first speech recognition sensitivity from among the plurality of different speech recognition sensitivities based on the first speech recognition sensitivity having a highest speech recognition success rate among the plurality of different speech recognition sensitivities at which the speech recognition success rate satisfies the first recognition success rate criterion.

The codes are configured to, when executed by the processor, further cause the processor to: identify users associated with the first plurality of speech data; obtain a personal speech recognition sensitivity from among the plurality of different speech recognition sensitivities for each of the users based on the pre-trained speech recognition model and the plurality of different speech recognition sensitivities, the personal speech recognition sensitivity corresponding to the optimal speech recognition sensitivity; and change the setting of the speech recognition sensitivity based on the personal speech recognition sensitivity of a corresponding current user of the device from among the users.

The first plurality of speech data may comprise a set wake-up word and a natural language command, and the speech recognition success rate of the speech recognition model may be determined by the processor based on the natural language command.

The codes may be configured to, when executed by the processor, further cause the processor to determine the speech recognition success rate of the speech recognition model for each of the first plurality of speech data based on a recognition result of a set keyword in the natural language command.

The codes are configured to, when executed by the processor, further cause the processor to: obtain a second plurality of speech data input at different times after changing the setting of the speech recognition sensitivity based on the first speech recognition sensitivity corresponding to the first plurality of speech data; apply the pre-trained speech recognition model to the second plurality of speech data at the plurality of different speech recognition sensitivities; obtain a second speech recognition sensitivity from among the plurality of different speech recognition sensitivities based on the pre-trained speech recognition model and the plurality of different speech recognition sensitivities, the second speech recognition sensitivity corresponding to the optimal speech recognition sensitivity at which the speech recognition success rate of the speech recognition model satisfies a set second recognition success rate criterion; and update the setting of the speech recognition sensitivity based on the second speech recognition sensitivity.

The codes are configured to, when executed by the processor, further cause the processor to output a confirmation sound in response to recognition of a wake-up word included in the first plurality of speech data, and wherein a volume level of the confirmation sound is set based on a matching score of the wake-up word.

The codes are configured to, when executed by the processor, further cause the processor to: recognize a request in the first plurality of speech data to change a wake-up word of the device, and extract a new wake-up word from the first plurality of speech data including the request to change the wake-up word; and set the new wake-up word as the wake-up word of the device.

The codes are configured to, when executed by the processor, further cause the processor to: obtain a higher speech recognition sensitivity among the plurality of different speech recognition sensitivities that is higher than the optimal speech recognition sensitivity, in response to the speech recognition success rate of the speech recognition model for a second plurality of speech data input after obtaining the optimal speech recognition sensitivity corresponding to the first plurality of speech data not satisfying the first recognition success rate criterion; and change the setting of the speech recognition sensitivity based on the higher speech recognition sensitivity.

According to another embodiment of the present disclosure, a device for changing a speech recognition sensitivity for speech recognition may include a processor, and a memory operatively coupled to the processor and configured to store at least one code executed in the processor, in which the memory stores codes configured to, when executed by the processor, cause the processor to: recognize a set wake-up word in speech data input for a set period of time; determine a speech recognition success rate for the wake-up word based on applying different speech recognition sensitives to the speech data; and change the speech recognition sensitivity for speech recognition based on the speech recognition success rate.

According to another embodiment of the present disclosure, a method for changing a speech recognition sensitivity for speech recognition of a device including a processor may include: obtaining, by the processor, a first plurality of speech data input at different times; applying, by the processor, a pre-trained speech recognition model to the first plurality of speech data at a plurality of different speech recognition sensitivities; obtaining by the processor, a first speech recognition sensitivity from among the plurality of different speech recognition sensitivities based on the pre-trained speech recognition model and the plurality of different speech recognition sensitivities, the first speech recognition sensitivity corresponding to an optimal speech recognition sensitivity at which a speech recognition success rate of the speech recognition model satisfies a set first recognition success rate criterion; and changing, by the processor, a setting of the speech recognition sensitivity based on the first speech recognition sensitivity obtained from among the plurality of different speech recognition sensitivities.

In addition, other methods and other systems for implementing the present disclosure, and a computer-readable recording medium storing computer programs for executing the above methods may be further provided.

The above and other aspects, features, and advantages of the present disclosure will become apparent from the detailed description of the following aspects in conjunction with accompanying drawings.

According to the present disclosure, it is possible to increase a speech recognition rate within a range in which speech uttered by a user is not misrecognized, by obtaining an optimal speech recognition sensitivity at a plurality of different speech recognition sensitivities based on speech recognition success rates for a plurality of speech data and changing a setting of the speech recognition sensitivity for speech recognition based on the optimal speech recognition sensitivity.

According to the present disclosure, it is possible to ensure that a user is not disturbed due to misrecognized results, by differently setting volume levels of confirmation sounds corresponding to the recognition of a wake-up words in a plurality of speech data based on matching scores of the wake-up word, and thereby when a keyword based on noise data (for example, TV sound data, music sound data) in speech data is misrecognized as the wake-up word, setting the volume level of the confirmation sound to be relatively low.

In addition, according to the present disclosure, it is possible to enable a user to conveniently operate a product through speech, even if the product (for example, a washing machine) including a device for changing a speech recognition sensitivity for speech recognition is shared and used, by customizing the speech recognition sensitivity for speech recognition for each user.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION OF THE EMBODIMENTS

Figure 1:
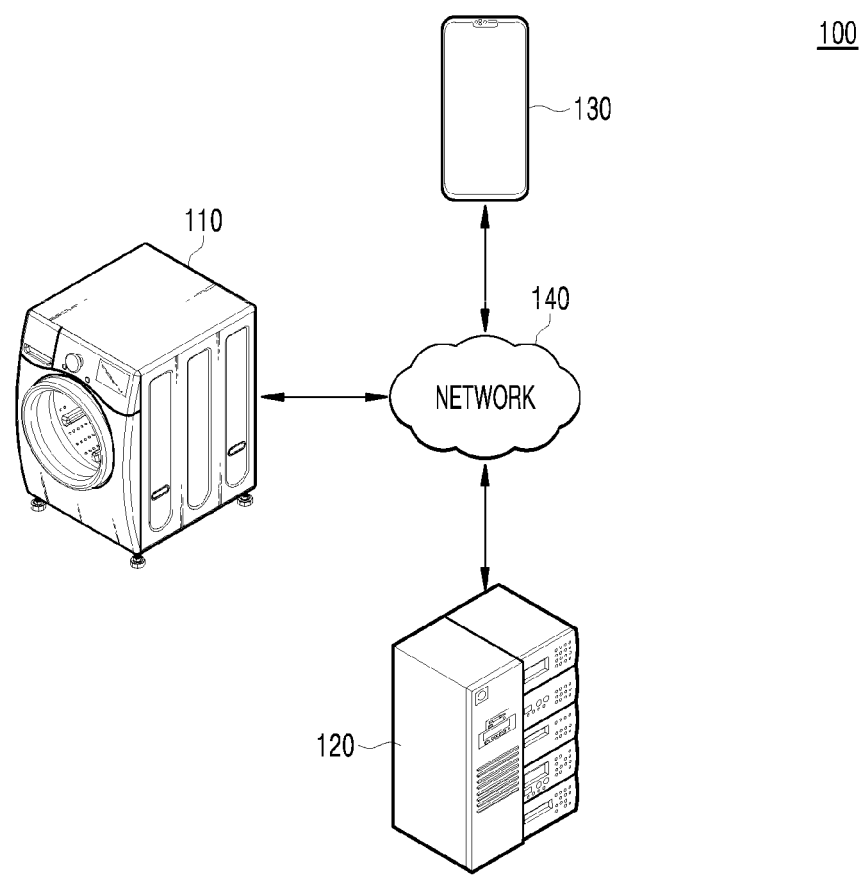
FIG. 1 is an example diagram illustrating a washing machine system environment including a washing machine having a device for changing a speech recognition sensitivity for speech recognition, a server, a user terminal, and a network that connects them to each other, according to one embodiment of the present disclosure.

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The embodiments disclosed below are provided so that this disclosure will be thorough and complete and will fully convey the scope of the present disclosure to those skilled in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will be omitted.

Hereinafter, a device for changing a speech recognition sensitivity for speech recognition according to one embodiment of the present disclosure may be applied to various products capable of speech recognition. The various products may include, for example, home appliances such as a washing machine, a TV, a voice recognition speaker, and the like, but are not limited thereto. For convenience of description, an embodiment of the product to which the device for changing the speech recognition sensitivity for speech recognition is applied will be described based on the washing machine.

FIG. 1 is an example diagram illustrating a washing machine system environment including a washing machine having a device for changing a speech recognition sensitivity for speech recognition, a server, a user terminal, and a network that connects them to each other, according to one embodiment of the present disclosure.

Referring to FIG. 1, the washing machine system environment 100 may include a washing machine 110, a server 120, a user terminal 130, and a network 140.

The washing machine 110 is an apparatus configured to process laundry through various operations such as washing, spin-drying, and/or drying. The washing machine 110 may include a washing machine configured to remove contaminants from the laundry (hereinafter also referred to as "cloth") using water and detergent, a dehydrator configured to spin dry the laundry by rotating a drum loaded with the wet laundry at high speed, a dryer configured to dry the laundry by supplying dry air into the drum loaded with the laundry, a combined dryer and washing machine having both a drying function and a washing function, and the like. Detailed structure of the washing machine 110 will be described below with reference to FIG. 2.

The washing machine 110 may process the laundry based on speech data input through a microphone. Here, the microphone may be mounted invisibly, for example, in a hole in a front surface of the washing machine 110.

The washing machine 110 that processes the laundry based on speech data uttered by a user may include a device for changing a speech recognition sensitivity for speech recognition. By using the device for changing the speech recognition sensitivity for speech recognition, the washing machine 110 may change a speech recognition success rate by automatically changing a setting of the speech recognition sensitivity for speech recognition, thereby recognizing the speech more accurately.

Specifically, the washing machine 110 may obtain a plurality of speech data input at different times, and apply a pre-trained speech recognition model to the plurality of speech data at a plurality of different speech recognition sensitivities. In this situation, the washing machine 110 may obtain, as an optimal speech recognition sensitivity, a speech recognition sensitivity among the plurality of speech recognition sensitivities at which the speech recognition success rate of the speech recognition model satisfies a set first recognition success rate criterion. Subsequently, the washing machine 110 may change the setting of the speech recognition sensitivity based on the optimal speech recognition sensitivity. The speech recognition model may be a learning model based on deep neural networks (DNNs), convolutional neural networks (CNNs), and long short term memory-recurrent neural networks (LSTM-RNNs).

In this situation, the washing machine 110 may apply, to the plurality of speech data, a speech recognition model that is pre-stored in the memory therein, for each of the plurality of different speech recognition sensitivities, but is not limited thereto. For example, the washing machine 110 may apply, to the plurality of speech data, a speech recognition model received in response to a speech recognition model request transmitted to the server 120. In addition, in response to the speech recognition model not being received from the server 120, the washing machine 110 may communicate with a speech server to receive the speech recognition model from the speech server.

In determining the speech recognition success rate, the washing machine 110 may extract a set wake-up word and a natural language command from the speech data, and determine the speech recognition success rate of the speech recognition model based on the extracted natural language command. In this situation, the washing machine 110 may determine the speech recognition success rate of the speech recognition model based on the result of recognizing a set keyword in the natural language command.

In addition, the washing machine 110 may apply, to the plurality of speech data, the speech recognition model for each of the plurality of different speech recognition sensitivities, to determine the speech recognition success rate of the speech recognition model, but is not limited thereto. For example, the washing machine 110 may obtain, from the server 120, a determined speech recognition success rate of the speech recognition model for each of the plurality of different speech recognition sensitivities.

Meanwhile, the washing machine 110 may receive, through a microphone, speech data including, but not limited to, a set wake-up word (for example, "Hi LG") and at least one natural language command (for example, "Set to standard course") in succession. For example, the washing machine 110 may receive first speech data including the set wake-up word, and then receive second speech data including the natural language command within a predetermined period of time (for example, 5 seconds) after outputting a confirmation sound in response to the recognition of the wake-up word in the first speech data.

Further, the washing machine 110 may automatically change a setting for the speech recognition sensitivity for speech recognition, based on the speech recognition success rate of the speech recognition model for the speech data uttered by the user, but is not limited thereto. For example, the washing machine 110 may manually change the setting for the speech recognition sensitivity based on a request to change the setting of the speech recognition sensitivity from the user terminal 130.

The server 120 may be, for example, an artificial intelligence (AI) server, and a database server that provides big data necessary for applying an artificial intelligence algorithm (for example, a speech recognition model) and a variety of service information based on the big data. In addition, the server 120 may include an application server for providing a speech recognition setting application to the user terminal 130, or a web server for providing a speech recognition setting website for the user terminal 130, and may thus allow the user terminal 130 to control the setting of the speech recognition sensitivity at the washing machine 110.

Here, artificial intelligence (AI) refers to a field of studying artificial intelligence or a methodology for creating the same. Moreover, machine learning refers to a field of defining various problems dealing in an artificial intelligence field and studying methodologies for solving the same.

Machine learning may also be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. An ANN may be defined by a connection pattern between neurons on different layers, a learning process for updating model parameters, and an activation function for generating an output value.

An artificial neural network may include an input layer, an output layer, and optionally one or more hidden layers. Each layer includes one or more neurons, and the artificial neural network may include synapses that connect the neurons to one another. In an artificial neural network, each neuron may output a function value of the activation function with respect to input signals input through the synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an artificial neural network is to determine a model parameter for significantly reducing a loss function. The loss function may be used as an indicator for determining an optimal model parameter in a learning process of an artificial neural network.

Machine learning may be classified into supervised learning, unsupervised learning, and reinforcement learning depending on the learning method.

Supervised learning may refer to a method for training the artificial neural network with training data that has been given a label. In addition, the label may refer to a target answer (or a result value) to be inferred by the artificial neural network when the training data is input to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique.

The server 120, which is an artificial intelligence server, may train, through machine learning, the speech recognition model to recognize a keyword or sentence, using greater than or equal to a set number of speech data as training data.

The server 120 may provide the speech recognition model to the washing machine 110 in response to a speech recognition model request from the washing machine 110. As a result, the speech recognition model may be applied to a plurality of speech data input to the washing machine 110, for each of a plurality of different speech recognition sensitivities.

As another example, the server 120 may determine the speech recognition success rate of the speech recognition model, by applying the speech recognition model to the plurality of speech data received from the washing machine 110, for each of the plurality of different speech recognition sensitivities. The server 120 may provide, to the washing machine 110, all of the determined speech recognition success rates of the speech recognition model for each of the plurality of different speech recognition sensitivities. Alternatively, the server 120 may obtain an optimal speech recognition sensitivity that satisfies a set recognition success rate, among the determined speech recognition success rates of the speech recognition model for each of the plurality of different speech recognition sensitivities, and provide the obtained optimal speech recognition sensitivity to the washing machine 110.

The user terminal 130 may be provided with a speech recognition setting application in the washing machine 110, from the server 120 (or an application server). Alternatively, the user terminal 130 may be provided with a service for speech recognition setting in the washing machine 110, from the server 120 (or a web server), after accessing the speech recognition setting website and performing an authentication process. In the present embodiment, the user terminal 130 may control the setting of the speech recognition sensitivity for speech recognition in the washing machine 110 through the speech recognition setting application or the speech recognition setting website.

In the present embodiment, the user terminal 130 may be a desktop computer, smartphone, notebook, tablet PC, smart TV, mobile phone, personal digital assistant (PDA), laptop, media player, micro-server, global positioning system (GPS) device, electronic book terminal, digital broadcasting terminal, navigation, kiosk, MP3 player, digital camera, home appliance, and other mobile or immobile computing devices which are operated by an user, but is not limited thereto. Further, the user terminal 130 may be a wearable terminal having a communication function and a data processing function, such as a watch, glasses, a hairband, a ring, or the like. The user terminal 130 is not limited to the aforementioned items, but may be any terminal capable of web-browsing.

The network 140 may interconnect the washing machine 110, the server 120, and the user terminal 130. The network 140 may include, but is not limited to, wired networks such as local area networks (LANs), wide area networks (WANs), metropolitan area networks (MANs), and integrated service digital networks (ISDNs), or wireless networks such as wireless LANs, CDMA, Bluetooth, satellite communications, and the like. The network 140 may also transmit or receive data using short distance communication and/or long distance communication. The short-range communication may include BLUETOOTH®, radio frequency identification (RFID), infrared data association (IrDA), ultra-wideband (UWB), ZIGBEE, and wireless-fidelity (Wi-Fi) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA).

The network 140 may include connection of network elements such as a hub, a bridge, a router, a switch, and a gateway. The network 140 may include one or more connected networks, for example, a multi-network environment, including a public network such as an Internet and a private network such as a safe corporate private network. Access to the network 140 can be provided via one or more wired or wireless access networks. Furthermore, the network 140 may support 5G communication and/or an Internet of things (IoT) network to exchanging and processing information between distributed components such as objects.

Figure 2:
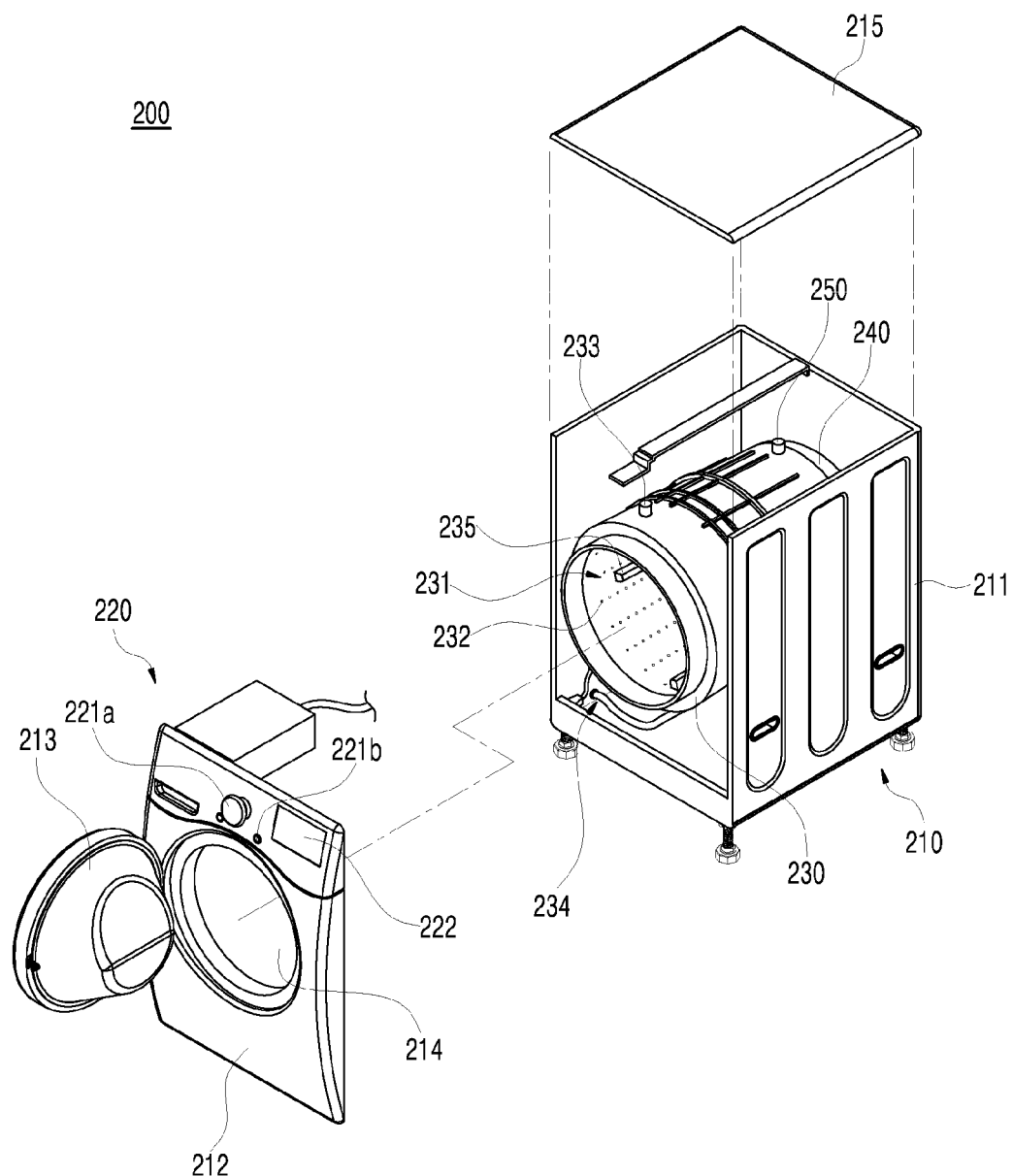
FIG. 2 is a diagram schematically illustrating a structure of a washing machine according to one embodiment of the present disclosure.

FIG. 2 is a diagram schematically illustrating a structure of a washing machine according to one embodiment of the present disclosure.

Referring to FIG. 2, a washing machine 200 may include a cabinet 210 forming an exterior, a tub 230 (that is, an outer tub) provided inside the cabinet 210 and supported by the cabinet 210, a drum 231 (that is, an inner tub) rotatably disposed inside the tub 230 and into which laundry is loaded, a driver 240 configured to rotate the drum by applying torque to the drum 231, a user interface (UI) 220 configured to allow a user to select and execute a washing course, a sensing unit 250 configured to sense various information, and a temperature sensor configured to measure a temperature. In this situation, the driver 240 may include, for example, a motor, and the UI 220 may include input interfaces 221a and 221b and an output interface 222.

In addition, the cabinet 210 may include a main body 211, a cover 212 provided and coupled to the front surface of the main body 211, and a top plate 215 coupled to an upper portion of the main body 211. The cover 212 may include an opening 214 provided to enable loading and unloading of the laundry, and a door 213 that selectively opens and closes the opening 214. Further, the drum 231 may be provided with a space for washing the laundry loaded therein, and may be rotated by receiving power from the driver 240. In addition, the drum 231 may be provided with a plurality of through holes 232. Accordingly, wash water stored in the tub 230 may be introduced into the drum 231 through the through holes 232 and the wash water inside the drum 231 may flow into the tub 230. Therefore, when the drum 231 is rotated, the laundry loaded in the drum 231 may be decontaminated through rubbing process with the wash water stored in the tub 230. Meanwhile, the drum 231 may further include a lifter 235 configured to stir the laundry.

The UI 220 is configured to allow the user to input information related to washing (including the entire operation process of the washing machine) as well as to check the information related to washing. That is, the UI 220 is configured to interface with the user. Thus, the UI 220 may be configured to include input interfaces 221a and 221b for allowing the user to input a control command, and an output interface 222 for displaying control information according to the control command. Further, the UI 220 may include a controller configured to control driving of the washing machine 200, including the operation of the driver 240, according to the control command. In the present embodiment, the UI 220 may refer to a control panel capable of input and output for the control of the washing machine 200. For this purpose, the UI 220 may be configured as a touch-sensitive display controller or various input/output controllers. As an example, the touch-sensitive display controller may provide an output interface and an input interface between the apparatus and the user. The touch-sensitive display controller may transmit and receive an electrical signal with the controller. In addition, the touch-sensitive display controller may display visual output to the user, and the visual output may include texts, graphics, images, videos, and combination thereof. The UI 220 may be, for example, any display member such as an organic light emitting display (OLED) capable of touch recognition, a liquid crystal display (LCD), or a light emitting display (LED).

That is, in this embodiment, the UI 220 may perform a function of the input interfaces 121 that receive a predetermined control instruction so that the user may control the overall operation of the washing machine 200. In addition, the UI 220 may perform a function of the output interface 122 that may display an operating state of the washing machine 200 under the control of the controller. In the present embodiment, the UI 220 may display an operation mode setting and/or a recommendation result of the washing machine 200 in response to a type of load of the laundry in the washing machine 200. In addition, the UI 220 may output content including a reason to change to the recommended course, a description of a situation in which cloth unwinding is inevitable due to UE occurrence, or the like.

Furthermore, in the present embodiment, the washing machine 200 may be provided with at least one water supply hose configured to guide water supplied from an external water source, such as a faucet, to the tub 230, and a water inlet 233 to control the at least one water supply hose. Further, the washing machine 200 may be provided with a dispenser configured to supply additives such as detergent, fabric softener and the like, into the tub 230 or the drum 231. In the dispenser, the additives may be classified and accommodated according to their type. The dispenser may include a detergent container configured to contain the detergent and a softener container configured to contain the fabric softener. Further, the washing machine 200 may be provided with water supply pipes configured to selectively guide the water supplied through the water inlet 233 to each container of the dispenser. The water inlet 233 may include a water supply valve configured to control each of the water supply pipes, and the water supply pipes may include respective water supply pipes to supply water to the detergent container and the fabric softener container, respectively.

Meanwhile, a drain hose 234 may include a drainage hole configured to discharge the water from the tub 230, and a pump configured to pump the discharged water. The pump may selectively perform a function of transporting the discharged water into a drain pipe and a function of transporting the discharged water into a circulation pipe. In this situation, the water that is transported by the pump and guided along the circulation pipe may be referred to as circulating water. The pump may include an impeller configured to transport water, a pump housing in which the impeller is accommodated, and a pump motor configured to rotate the impeller. In the pump housing, an inlet port through which water is introduced, a drain discharge port configured to discharge the water transported by the impeller into the drain pipe, and a circulating water discharge port configured to discharge the water transported by the impeller into a circulation pipe may be formed. Here, the pump motor may be capable of forward/reverse rotation. That is, in the present embodiment, the water may be discharged through the drain discharge port or discharged through the circulating water discharge port, according to the direction in which the impeller is rotated. This configuration may be implemented by appropriately designing a structure of the pump housing. Since this technique is well known, a detailed description thereof will be omitted.

Meanwhile, the pump is capable of varying a flow rate (or discharge water pressure), and for this purpose, the pump motor constituting the pump may be a variable speed motor capable of controlling the rotational speed. The pump motor may be a brushless direct current motor (BLDC motor), but is not limited thereto. A driver for controlling the speed of motor may be further provided, and the driver may be an inverter driver. The inverter driver may convert AC power to DC power and input it to the motor at a desired frequency. In addition, the pump motor may be controlled by the controller, and the controller may be configured to include a Proportional-Integral Controller (PI controller), a Proportional-Integral-Derivative Controller (PID controller) or the like. The controller may receive an output value (for example, output current) of the pump motor, and control the output value of the driver so that revolution per minute of the pump motor follows a predetermined target revolution per minute based the received value. In addition, the controller may control the overall operation of the washing machine as well as the pump motor.

Meanwhile, in this embodiment, the washing machine 200 may include at least one balancer, in the front of the tub 230, along the circumference of the inlet of the tub 230. The balancer is for reducing vibration of the tub 230 and is a weight having a predetermined weight, and may be provided in plurality. For example, the balancers may be provided at the bottom of the front of the tub 230 as well as both the left and right sides of the front of the tub 230.

The sensing unit 250 may be configured to include a motor driving current sensor and a drum rotational speed sensor. In addition, the sensing unit 250 may further include a sensor configured to sense chemicals remaining in the wash water, an olfactory sensor configured to sense contaminated laundry, and the like, among the sensors. In addition, foreign matter or the like included in the laundry may be sensed through a reflected wave by a wave sensor. For example, when the laundry includes metal such as a coin or the like, the foreign matter such as a coin or the like may be sensed by using characteristics of the reflected wave of the wave sensor. The motor driving current sensor may sense a driving current of the motor, and the drum rotation speed sensor may sense the rotation speed of the drum and output sensing data based on sensing the type of laundry.

Meanwhile, the washing machine 200 may accurately recognize speech uttered by the user by controlling the setting of the speech recognition sensitivity for speech recognition based on the input plurality of speech data.

Figure 3:
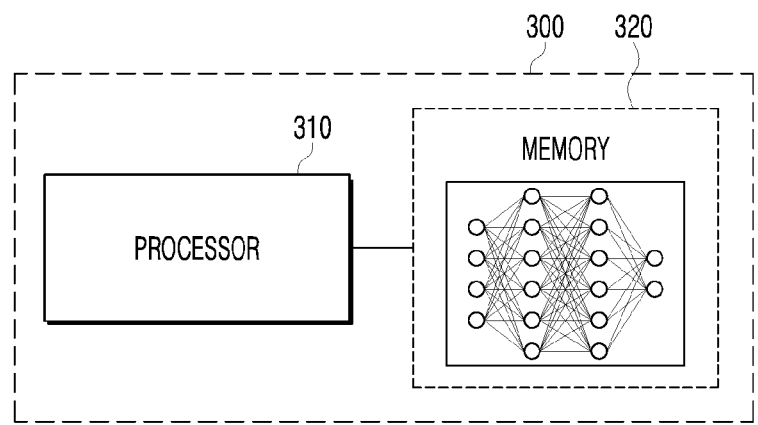
FIG. 3 is a diagram schematically illustrating a configuration of a device for changing a speech recognition sensitivity for speech recognition, according to one embodiment of the present disclosure.

FIG. 3 is a diagram schematically illustrating a configuration of a device for changing a speech recognition sensitivity for speech recognition, according to one embodiment of the present disclosure.

Referring to FIG. 3, the device for changing the speech recognition sensitivity for speech recognition 300 according to one embodiment of the present disclosure may include a processor 310 and a memory 320.

The processor 310 may obtain a plurality of speech data input at different times. For example, the processor 310 may receive four speech data at different times, over 48 hours. The processor 310 may apply a pre-trained speech recognition model to the plurality of speech data, at a plurality of different speech recognition sensitivities. Based on the result of the application, the processor 310 may set a volume level of a confirmation sound corresponding to recognition of a wake-up word in the plurality of speech data, and determine a speech recognition success rate of the speech recognition model for the plurality of speech data at each of the plurality of different speech recognition sensitivities.

Here, each speech data may include a set wake-up word (for example, 'Hi LG') and a natural language command.

In this situation, the processor 310 may output a confirmation sound (for example, a beep sound) in response to recognizing the wake-up word included in the speech data. Here, the processor 310 may set the volume level of the confirmation sound based on a matching score of the wake-up word. Specifically, as a result of applying the speech recognition model to the speech data, the processor 310 may recognize a keyword (or sentence) based on the speech data, and determine the matching score between the keyword and the set wake-up word. The processor 310 may compare the determined matching score with a set reference matching score, and set the volume levels of the confirmation sounds differently based on the comparison result.

In this situation, the processor 310 may set the volume level of the confirmation sound to '0 dB' to limit the output of the confirmation sound, based on the result of the determined matching score being less than the reference matching score. That is, the processor 310 may determine that the keyword is not the wake-up word, and set the output of the confirmation sound to be limited. In contrast, the processor 310 may set the volume level of the confirmation sound differently depending on a difference between the determined matching score and the reference matching score, based on the result of the determined matching score being greater than or equal to the reference matching score.

For example, when the set reference matching score is '0.6' and when the determined matching score is '0.4,' since the determined matching score is less than the reference matching score, the processor 310 may set the volume level of the confirmation sound to '0 dB.' In contrast, when the determined matching score is greater than or equal to 0.6, since the determined matching score is greater than or equal to the reference matching score (0.6), the processor 310 may set the volume level of the confirmation sound differently depending on the difference between the determined matching score and the reference matching score. For example, when the determined matching score is '0.6' (or 0.6 or more but less than 0.7), the processor 310 may set the volume level of the confirmation sound to '20 dB.' Further, when the determined matching score is '0.7' (or '0.7' or more but less than '0.8'), the processor 310 may set the volume level of the confirmation sound to '30 dB.' Further, when the determined matching score is '0.8' (or 0.8 or more but less than 0.9), the processor 310 may set the volume level of the confirmation sound to '40 dB.' Further, when the determined matching score is '0.9' (or '0.9' or more), the processor 310 may set the volume level of the confirmation sound to '60 dB.'

Subsequently, the processor 310 may individually set the volume levels of the confirmation sounds corresponding to the recognition of the wake-up word in the plurality of speech data, in relation to the plurality of speech data input at different times. Then, the processor 310 may finally set the volume level of the confirmation sound corresponding to the recognition of the wake-up word, based on the set volume levels of the plurality of confirmation sounds. For example, the processor 310 may calculate an average value for the volume levels of confirmation sounds corresponding to the recognition of the wake-up word in the four speech data, and set the average value as a final volume level of the confirmation sound. Further, the processor 310 may calculate the average value for the remaining volume levels of the confirmation sounds, except for the volume levels of the confirmation sounds that are less than the set reference volume level (for example, '0 dB' or '60 dB'), and set the average value as the final volume level of the confirmation sound.

As a result, in response to the determined matching score being greater than or equal to the reference matching score but the determined matching score being relatively low, the processor 310 may recognize the keyword as the wake-up word, but the processor 310 may set the volume level of the confirmation sound to be relatively low, based on the possibility that a keyword based on noise data (for example, TV sound data, music sound data) in speech data may be misrecognized as the wake-up word. As a result, the processor 310 may reduce the likelihood that the user is disturbed by the confirmation sound resulting from misrecognition of the wake-up word. In contrast, the processor 310 may set the volume level of the confirmation sound to be relatively high, in response to the determined matching score being relatively high. As a result, the processor 310 may provide an environment that allows the user to confirm that the uttered wake-up word has been normally recognized.

Based on the result of applying the speech recognition model, the processor 310 may determine the speech recognition success rate of the speech recognition model based on the natural language command. In this situation, the processor 310 may determine the speech recognition success rate of the speech recognition model for each of the plurality of speech data, based on the result of recognition of a set keyword in the natural language command. Here, the speech recognition model may be a machine learning-based learning model that is pre-trained to recognize a keyword or sentence, using greater than or equal to a set number of speech data as training data. Specifically, the processor 310 may recognize the natural language command in addition to the wake-up word, based on the keyword (or sentence) recognized as a result of the application of the speech recognition model to the speech data. In addition, the processor 310 may confirm a recognition result of the set keyword in the natural language command, based on the association (or a degree of matching greater than or equal to a set value) between the recognized natural language command and the set keyword (or sentence) (for example, the set keyword or sentence in connection with washing).

For example, the processor 310 may recognize "Set to a standard course" as the natural language command, calculate the association between the natural language command of "Set to a standard course" and the set keyword (for example, "standard course"), and determine that the recognition result of the set keyword in the natural language command is successful based on confirmation that there is the association.

Subsequently, the processor 310 may determine whether recognition result of the set keyword in the natural language command of the plurality of speech data is successful, in relation to each of the plurality of speech data input at different times. Further, the processor 310 may determine the speech recognition success rate of the speech recognition model based on the number of times of successful recognition of the set keyword in the natural language command of the plurality of speech data. For example, the processor 310 may determine the speech recognition success rate of the speech recognition model as 75%, based on a determination that three of the recognition results of the set keyword in the natural language command of four speech data are successful.

Subsequently, the processor 310 may obtain an optimal speech recognition sensitivity, among the plurality of different speech recognition sensitivities, at which the speech recognition success rate of the speech recognition model satisfies a set first recognition success rate criterion. Further, the processor 310 may change a setting of the speech recognition sensitivity based on the optimal speech recognition sensitivity. Specifically, the processor 310 may determine the speech recognition success rate of the speech recognition model for each of the plurality of speech recognition sensitivities, obtain, as the optimal speech recognition sensitivity, a speech recognition sensitivity at which a speech recognition success rate among the speech recognition success rates of speech recognition model is greater than or equal to the first recognition success rate criterion, and change the setting of the speech recognition sensitivity based on the optimal speech recognition sensitivity. As a result, the processor 310 may easily recognize the speech within a range in which the speech uttered by the user is not misrecognized.

As an example of obtaining the optimal speech recognition sensitivity, the processor 310 may obtain, as the optimal speech recognition sensitivity, a speech recognition sensitivity having the highest speech recognition success rate among a plurality of speech recognition sensitivities at which the speech recognition success rate satisfies the first recognition success rate criterion. For example, based on a determination that the first recognition success rate criterion is '60%' and the speech recognition success rate of the speech recognition model is respectively '50%,' '70%,' and '90%' for each of the plurality of speech recognition sensitivities of 'low,' normal; and 'high' (or 'lower,' middle; and 'upper'), the processor 310 may obtain, as the optimal speech recognition sensitivity, the speech recognition sensitivity of 'high', which is the speech recognition sensitivity having the highest speech recognition success rate among the plurality of speech recognition sensitivities of 'normal' and 'high' that satisfy the first recognition success rate criterion. Here, the plurality of speech recognition sensitivities are not limited to three speech recognition sensitivities of 'low,' normal; and 'high.' For example, the plurality of speech recognition sensitivities may be defined by speech recognition sensitivity by step (for example, speech recognition sensitivities of 1 to 10 steps) or speech recognition sensitivities by score (for example, speech recognition sensitivities of 1 to 100 points).

Subsequently, the processor 310 may obtain a plurality of speech data input after obtaining the optimal speech recognition sensitivity, obtain a speech recognition sensitivity among the plurality of speech recognition sensitivities that is lower than the optimal speech recognition sensitivity, in response to the speech recognition success rate of the speech recognition model for the plurality of speech data satisfying a second recognition success rate criterion (which may be higher than the first recognition success rate criterion), and change the setting of the speech recognition sensitivity based on the obtained speech recognition sensitivity. Specifically, the processor 310 may obtain a speech recognition sensitivity among the plurality of speech recognition sensitivities that is lower than the optimal speech recognition sensitivity, in response to the speech recognition success rate of the speech recognition model for the plurality of speech data input after obtaining the optimal speech recognition sensitivity being greater than or equal to the second recognition success rate criterion, and change the setting of the speech recognition sensitivity based on the obtained speech recognition sensitivity. For example, the processor 310 may obtain the speech recognition sensitivity of 'normal' among the plurality of speech recognition sensitivities of 'low,' 'normal,' and 'high', as a speech recognition sensitivity that is lower (for example, one level of speech recognition sensitivity lower) than the optimal speech recognition sensitivity (for example, speech recognition sensitivity of 'high'), based on a determination that the second recognition success rate is '95%' and the speech recognition success rate of the speech recognition model for the plurality of speech data input after obtaining the optimal speech recognition sensitivity is '97%,' and change the setting of the speech recognition sensitivity based on the speech recognition sensitivity of 'normal.'

As a result, based on a determination that the speech recognition success rate of the set speech recognition sensitivity is high, the processor 310 may change the speech recognition sensitivity to be lower in response to a determination that the matching degree for speech uttered by the user is greater than necessary. As a result, the processor 310 may minimize misrecognition within a range in which the speech uttered by the user may be easily recognized.

As another example, the processor 310 may obtain the plurality of speech data input after obtaining the optimal speech recognition sensitivity, change the optimal speech recognition sensitivity to be as low as the set speech recognition sensitivity, in response to the speech recognition success rate of the speech recognition model for the plurality of speech data satisfying the second recognition success rate criterion, and change the setting of the speech recognition sensitivity based on the changed optimal speech recognition sensitivity.

Further, the processor 310 may obtain the plurality of speech data input after obtaining the optimal speech recognition sensitivity, obtain a speech recognition sensitivity among the plurality of speech recognition sensitivities that is higher than the optimal speech recognition sensitivity, in response to the speech recognition success rate of the speech recognition model for the plurality of speech data not satisfying the first recognition success rate criterion, and change the setting of the speech recognition sensitivity based on the obtained speech recognition sensitivity. Specifically, the processor 310 may obtain the plurality of speech data input after obtaining the optimal speech recognition sensitivity, obtain a speech recognition sensitivity among the plurality of speech recognition sensitivities that is higher than the optimal speech recognition sensitivity, in response to the speech recognition success rate of the speech recognition model for the plurality of speech data being less than a first recognition success rate criterion, and change the setting of the speech recognition sensitivity based on the obtained speech recognition sensitivity. For example, the processor 310 may obtain the speech recognition sensitivity of 'normal' among the plurality of speech recognition sensitivities of 'low,' 'normal,' and 'high,' as a speech recognition sensitivity that is higher (for example, one level of speech recognition sensitivity higher) than the optimal speech recognition sensitivity (for example, speech recognition sensitivity of 'low'), based on a determination that the first recognition success rate is '40%' and the speech recognition success rate of the speech recognition model for the plurality of speech data input after obtaining the optimal speech recognition sensitivity is '35%,' and change the setting of the speech recognition sensitivity based on the speech recognition sensitivity of 'normal.'

Accordingly, based on a determination that the speech recognition success rate of the set speech recognition sensitivity is low, the processor 310 may change the speech recognition sensitivity to be higher, in response to the matching degree for speech uttered by the user being low. As a result, the processor 310 may easily recognize the speech uttered by the user.

As another example, the processor 310 may change the optimal speech recognition sensitivity to be as high as the set speech recognition sensitivity, in response to the speech recognition success rate of the speech recognition model for the plurality of speech data input after obtaining the optimal speech recognition sensitivity not satisfying the first recognition success rate criterion, and change the setting of the speech recognition sensitivity based on the changed optimal speech recognition sensitivity.

Meanwhile, the processor 310 may identify users associated with the plurality of speech data, obtain an optimal speech recognition sensitivity for each user by applying the speech recognition model to the plurality of speech data for each user, and change the setting of the speech recognition sensitivity corresponding to each of the users, based on the optimal speech recognition sensitivity for each user. In this situation, the processor 310 may identify the users associated with the plurality of speech data based on, for example, speech data for each user that is pre-stored in the memory 320.

That is, the processor 310 may individually customize the speech recognition sensitivities for speech recognition corresponding to the users, based on the optimal speech recognition sensitivity for each user. As a result, even if a product (for example, a washing machine) that includes the device for changing the speech recognition sensitivity for speech recognition is shared and used, the processor 310 may enable the users to conveniently operate the product through speech.

In addition, the processor 310 may recognize a request to change the wake-up word in the input speech data, extract a new wake-up word from the speech data including the request to change the wake-up word, and set the new wake-up word as the wake-up word. As a result, the processor 310 may allow the user to use a keyword that is convenient to pronounce. For example, the processor 310 may extract 'LG Tromm' as the new wake-up word from speech data including the request to change the wake-up word, and set 'LG Tromm' as the wake-up word, thereby changing 'Hi LG', which is preset as the wake-up word, to 'LG Tromm.'

Further, according to another embodiment of the present disclosure, the processor 310 in the device for changing the speech recognition sensitivity for speech recognition may recognize a set wake-up word in the speech data input for a set period of time, and determine the speech recognition success rate for the wake-up word. Thereafter, the processor 310 may change the speech recognition sensitivity for speech recognition based on the speech recognition success rate. The speech recognition sensitivity may be defined as, for example, any one of the set speech recognition sensitivities of 'low,' 'normal,' and 'high,' or defined as any one of the set speech recognition sensitivities by step (for example, speech recognition sensitivities of 1 to 10 steps). Furthermore, for example, the speech recognition sensitivity may be defined as any one of speech recognition sensitivities by score (for example, speech recognition sensitivities of 1 to 100 points).

In determining the speech recognition success rate for the wake-up word, the processor 310 may determine the speech recognition success rate of the speech recognition model, based on the natural language command recognized in the speech data input for the set period of time.

Specifically, the processor 310 may change a preset speech recognition sensitivity to be as high as a set value, based on the result of the speech recognition success rate of the speech recognition model for the speech data input for the set period of time being less than the first recognition success rate criterion. In contrast, the processor 310 may change the preset speech recognition sensitivity to be as low as the set value, based on the result of the speech recognition success rate of the speech recognition model for the speech data input for the set period of time being greater than or equal to the second recognition success rate criterion. Here, the second recognition success rate criterion may be higher than the first recognition success rate criterion.

The memory 320 may be operatively coupled to the processor 310 and store at least one code in association with operations performed by the processor 310. The memory 320 may further store the speech data for each user.

In addition, the memory 320 may perform a function of temporarily or permanently storing data processed by the processor 310. Herein, the memory 320 may include magnetic storage media or flash storage media, but the scope of the present disclosure is not limited thereto. The memory 320 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

Figure 4:
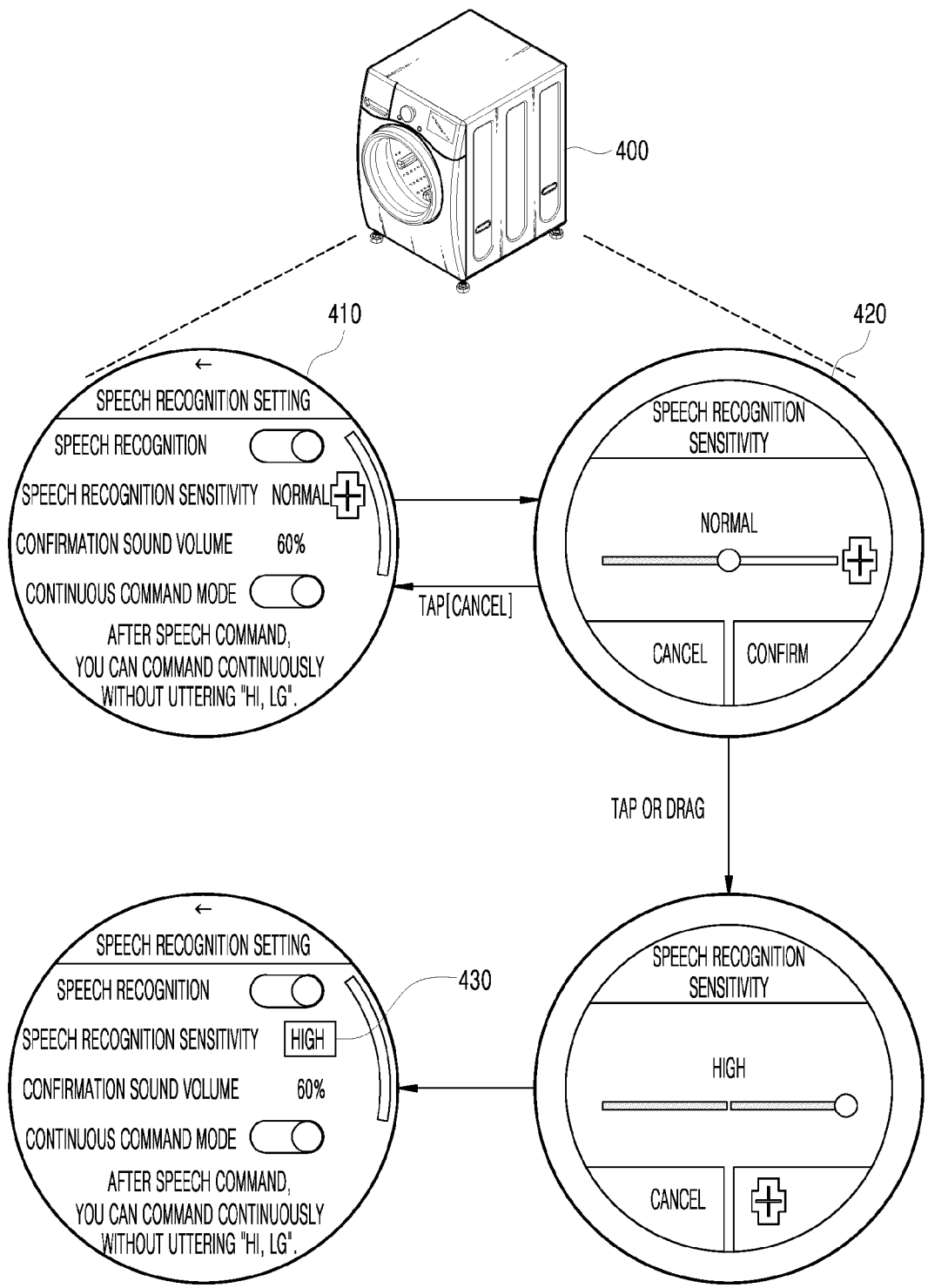
FIG. 4 is a diagram illustrating an example of changing a speech recognition setting in a washing machine including a device for changing a speech recognition sensitivity for speech recognition, according to one embodiment of the present disclosure.

FIG. 4 is a diagram illustrating an example of changing a speech recognition setting in a washing machine including a device for changing a speech recognition sensitivity for speech recognition, according to one embodiment of the present disclosure.

Referring to FIG. 4, the washing machine may include the device for changing the speech recognition sensitivity for speech recognition. By using the device for changing the speech recognition sensitivity for speech recognition, the washing machine 110 may automatically change a setting for the speech recognition sensitivity for speech recognition, based on a speech recognition success rate of the speech recognition model for the speech data uttered by the user, but is not limited thereto. For example, in the washing machine, the setting for the speech recognition sensitivity for speech recognition may be manually changed through the UI.

Specifically, the washing machine 400 may display a speech recognition setting screen 410 when a request for speech recognition setting is input by the user, through the UI. The speech recognition setting screen 410 may include, for example, an item related to at least one of whether to activate the speech recognition, the speech recognition sensitivity, a volume of confirmation sound, or whether to activate a continuous command mode, but is not limited thereto. In addition, the speech recognition setting screen 410 may further include, for example, an item for changing the volume level of speech guidance.

The washing machine 400 may provide a speech recognition sensitivity changing screen 420 through which the setting of the speech recognition sensitivity for speech recognition may be changed, based on the item for changing the speech recognition sensitivity being selected. In this situation, the speech recognition sensitivity for speech recognition may be preset to 'normal' as a default.

The washing machine 400 may change the speech recognition sensitivity for speech recognition to 'high' 430, based on the request to change to 'high' for the speech recognition sensitivity for speech recognition being received on the speech recognition sensitivity changing screen 420.

Figure 5:
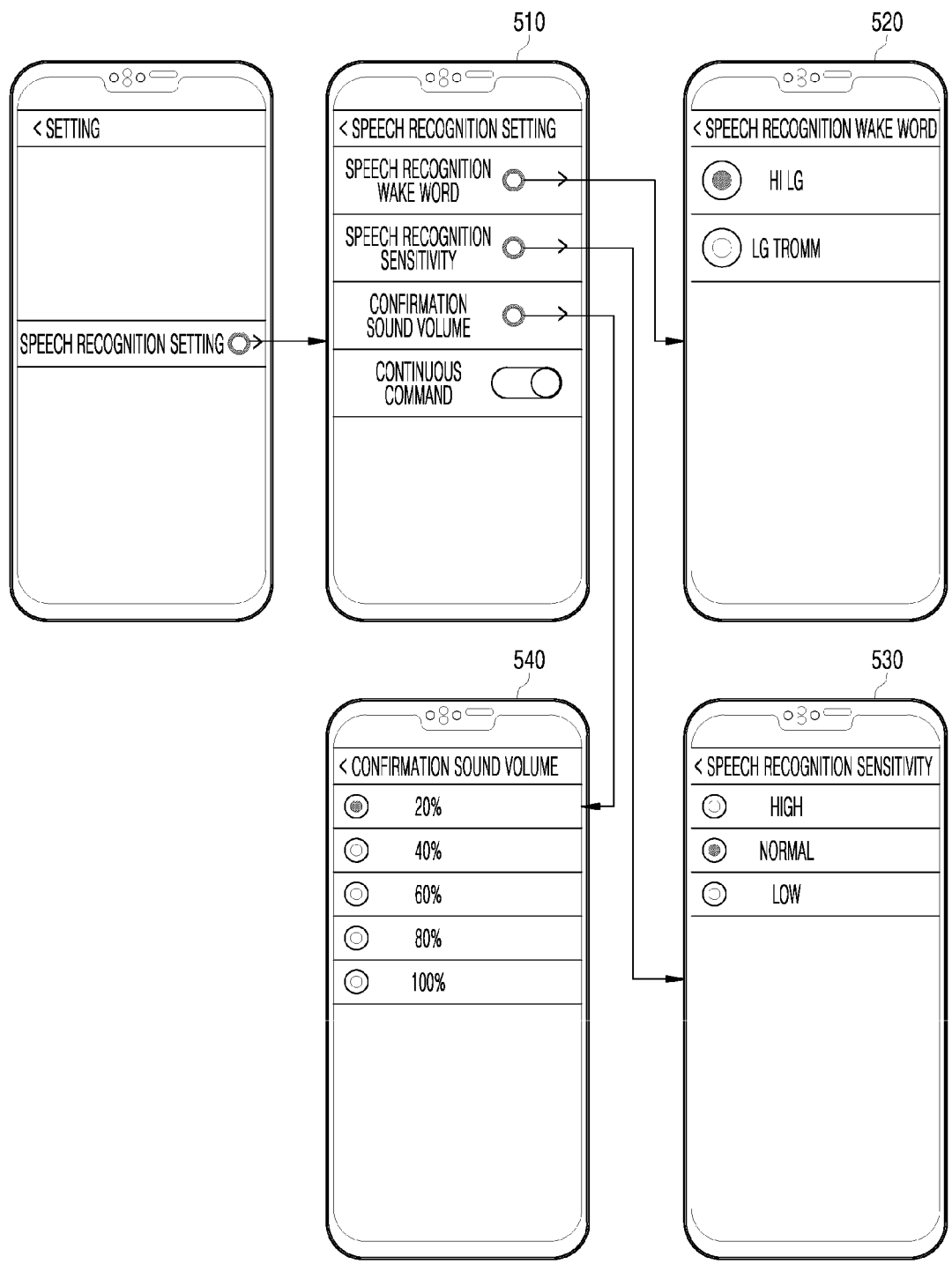
FIG. 5 is a diagram illustrating an example of changing a speech recognition setting, through a user terminal, in a washing machine including a device for changing a speech recognition sensitivity for speech recognition, according to one embodiment of the present disclosure.

FIG. 5 is a diagram illustrating an example of changing a speech recognition setting, through a user terminal, in a washing machine including a device for changing a speech recognition sensitivity for speech recognition, according to one embodiment of the present disclosure.

Referring to FIG. 5, the washing machine may include the device for changing a speech recognition sensitivity for speech recognition. By using the device for changing the speech recognition sensitivity for speech recognition, the washing machine 110 may automatically change a setting for the speech recognition sensitivity for speech recognition, based on a speech recognition success rate of the speech recognition model for the speech data uttered by the user, but is not limited thereto. For example, in the washing machine 110, the setting for the speech recognition sensitivity for speech recognition may be manually changed, based on a request to change the setting of the speech recognition sensitivity for speech recognition from the user terminal.

Specifically, the user terminal (for example, a smartphone) that communicates with the washing machine may display a speech recognition setting screen 510 when a request for speech recognition setting is input by the user. The speech recognition setting screen 510 may include, for example, an item relating to at least one of a speech recognition wake word, the speech recognition sensitivity, a volume of confirmation sound, or whether to activate a continuous command mode. In addition, the speech recognition setting screen 510 may further include an item for changing the volume level of speech guidance.

The user terminal may display a speech recognition wake word changing screen 520 including a list of preset wake words, based on the item relating to the speech recognition wake word on the speech recognition setting screen 510 being selected, thereby allowing the settings of the speech recognition wake word to be changed. For example, when 'Hi LG' is selected from among the list of preset wake words, the user terminal may send, to the washing machine, a request to change the setting of the wake-up word to 'Hi LG,' thereby setting the wake-up word in the washing machine to 'Hi LG.' In this situation, the user terminal may add any wake word to the list of preset wake words. When any wake word is selected, the user terminal may send, to the washing machine, the request to change the setting of the wake-up word to the selected wake word, thereby setting the wake-up word in the washing machine to the selected wake word. This makes it possible to use a keyword that is easy for the user to utter as the wake-up word in the washing machine.

In addition, the user terminal may display a speech recognition sensitivity changing screen 530 including a list of plurality of speech recognition sensitivities, based on the item relating to the speech recognition sensitivity on the speech recognition setting screen 510 being selected, thereby allowing the setting of the speech recognition sensitivity to be changed. The user terminal, for example, may send, to the washing machine, a request to change the setting of the speech recognition sensitivity to 'normal,' when 'normal' is selected from among the list of the plurality of speech recognition sensitivities, thereby setting the speech recognition sensitivity in the washing machine to 'normal.'

Furthermore, the user terminal may display a volume changing screen of a confirmation sound 540 including a list of a plurality of volumes, based on the item relating to the volume of the confirmation sound on the speech recognition setting screen 510 being selected, thereby allowing the setting for the volume level of the confirmation sound to be changed. For example, the user terminal may send, to the washing machine, a request to change the setting for the volume level of the confirmation sound to 20%, based on '20%' being selected from among the list of the plurality of volumes, thereby setting the volume level of the confirmation sound corresponding to the recognition of the wake-up word in the washing machine to '20%.'

Figure 6:
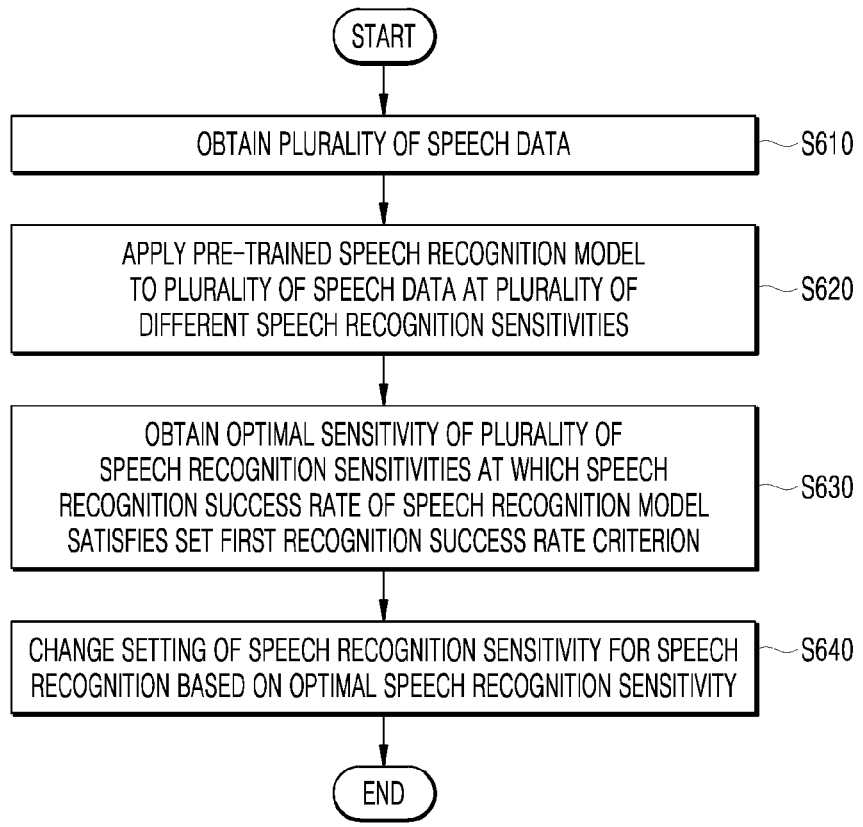
FIG. 6 is a flowchart schematically illustrating a method for changing a speech recognition sensitivity for speech recognition, according to one embodiment of the present disclosure.

FIG. 6 is a flowchart schematically illustrating a method for changing a speech recognition sensitivity for speech recognition, according to one embodiment of the present disclosure. Herein, a device for changing a speech recognition sensitivity for speech recognition, which implements the method for changing the speech recognition sensitivity for speech recognition according to the present disclosure, may pre-store a speech recognition model in memory. Here, the speech recognition model may be a machine learning-based learning model that is pre-trained to recognize a keyword or sentence, using greater than or equal to a set number of speech data as training data.

Referring to FIG. 6, in step S610, the device for changing the speech recognition sensitivity for speech recognition may obtain a plurality of speech data input at different times. Here, each speech data may include a set wake-up word (for example, 'Hi LG') and a natural language command.

In step S620, the device for changing the speech recognition sensitivity for speech recognition may apply a pre-trained speech recognition model to the plurality of speech data at a plurality of different speech recognition sensitivities.

In this situation, the device for changing the speech recognition sensitivity for speech recognition may output a confirmation sound in response to recognition of a wake-up word included in the speech data. Here, the device for changing the speech recognition for speech recognition may set a volume level of the confirmation sound based on a matching score of the wake-up word. The device for changing the speech recognition sensitivity for speech recognition may compare the determined matching score with a set reference matching score, and set the volume level of the confirmation sound based on the comparison result. In this situation, the device for changing the speech recognition sensitivity for speech recognition may set the volume level of the confirmation sound to '0 dB' and limit the output of the confirmation sound, based on the result of the determined matching score being less than the reference matching score. In contrast, the device for changing the speech recognition sensitivity for speech recognition may set the volume level of the confirmation sound differently depending on a difference between the determined matching score and the reference matching score, based on the result of the determined matching score being greater than or equal to the reference matching score.

In addition, the device for changing the speech recognition sensitivity for speech recognition may determine a speech recognition success rate of the speech recognition model, based on the natural language command included in the speech data. Here, the device for changing the speech recognition sensitivity for speech recognition may determine the speech recognition success rate of the speech recognition model for each of the plurality of speech data, based on the result of the recognition of a set keyword in the natural language command. For example, the device for changing the speech recognition sensitivity for speech recognition may recognize "Set to a standard course" as a natural language command, calculate an association between the natural language command of "Set to a standard course" and the set keyword (for example, "standard course"), and determine that the recognition result of the set keyword in the natural language command is successful based on the confirmation that there is the association.

In step S630, the device for changing the speech recognition sensitivity for speech recognition may obtain an optimal sensitivity, among the plurality of speech recognition sensitivities, at which the speech recognition success rate of the speech recognition model satisfies a set first recognition success rate criterion.

In this situation, the device for changing the speech recognition sensitivity for speech recognition may obtain, as the optimal speech recognition sensitivity, a speech recognition sensitivity having the highest speech recognition success rate among a plurality of speech recognition sensitivities at which the speech recognition success rate satisfies the first recognition success rate criterion.

In step S640, the device for changing the speech recognition sensitivity for speech recognition may change a setting of the speech recognition sensitivity for speech recognition, based on the optimal speech recognition sensitivity.

Subsequently, the device for changing the speech recognition sensitivity for speech recognition may obtain a plurality of speech data input after obtaining the optimal speech recognition sensitivity for updating the speech recognition sensitivity again, obtain a speech recognition sensitivity among the plurality of speech recognition sensitivities that is lower than the optimal speech recognition sensitivity that was previously set, in response to the speech recognition success rate of the speech recognition model for the plurality of speech data satisfying a second recognition success rate criterion (which may be higher than the first recognition success rate criterion), and change/update the setting of the speech recognition sensitivity based on the newly obtained speech recognition sensitivity.

In addition, the device for changing the speech recognition sensitivity for speech recognition may obtain the plurality of speech data input after obtaining the optimal speech recognition sensitivity, obtain a speech recognition sensitivity among the plurality of speech recognition sensitivities that is higher than the optimal speech recognition sensitivity, in response to the speech recognition success rate of the speech recognition model for the plurality of speech data not satisfying the first recognition success rate criterion, and change the setting of the speech recognition sensitivity based on the obtained speech recognition sensitivity.

Meanwhile, the device for changing the speech recognition sensitivity for speech recognition may identify users associated with the plurality of speech data, obtain an optimal speech recognition sensitivity for each user by applying the speech recognition model to the plurality of speech data for each user, and change the settings of the speech recognition sensitivity corresponding to each of the users, based on the optimal speech recognition sensitivity for each user.

In addition, the device for changing the speech recognition sensitivity for speech recognition may recognize a request to change the setting of the wake-up word in the input speech data, extract a new wake-up word from the speech data including the request to change the setting of the wake-up word, and set the new wake-up word as the wake-up word. For example, the device for changing the speech recognition sensitivity for speech recognition may extract 'LG Tromm' as the new wake-up word from speech data including the request to change the wake-up word, and set 'LG Tromm' as the wake-up word, thereby changing 'Hi LG', which is preset as the wake-up word, to 'LG Tromm.'

The example embodiments described above may be implemented through computer programs executable through various components on a computer, and such computer programs may be recorded in computer-readable media. In this situation, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present application (especially in the appended claims), the terms "a/an" and "the" include both singular and plural references, unless the context clearly states otherwise. It should further be understood that any numerical range recited herein is intended to include all sub-ranges subsumed therein (unless expressly indicated otherwise) and therefore, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Further, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A device for changing a speech recognition sensitivity for speech recognition, comprising:
   a processor; and
   a memory operatively coupled to the processor and configured to store at least one code executable by the processor,
   wherein the memory stores codes configured to, when executed by the processor, cause the processor to:
   obtain a first plurality of speech data input at different times;
   apply a pre-trained speech recognition model to the first plurality of speech data at a plurality of different speech recognition sensitivities;
   obtain a first speech recognition sensitivity from among the plurality of different speech recognition sensitivities based on the pre-trained speech recognition model and the plurality of different speech recognition sensitivities, the first speech recognition sensitivity corresponding to an optimal speech recognition sensitivity at which a speech recognition success rate of the pre-trained speech recognition model satisfies a set first recognition success rate criterion;
   change a setting of the speech recognition sensitivity based on the first speech recognition sensitivity obtained from among the plurality of different speech recognition sensitivities;
   identify users associated with the first plurality of speech data;
   obtain a personal speech recognition sensitivity from among the plurality of different speech recognition sensitivities for each of the users based on the pre-trained speech recognition model and the plurality of different speech recognition sensitivities, the personal speech recognition sensitivity corresponding to the optimal speech recognition sensitivity; and change the setting of the speech recognition sensitivity based on the personal speech recognition sensitivity of a corresponding current user of the device from among the users.

2. The device of claim 1, wherein the device is a washing machine for washing clothes or a dryer for drying clothes.

3. The device of claim 1, wherein the codes are configured to, when executed by the processor, further cause the processor to obtain the first speech recognition sensitivity from among the plurality of different speech recognition sensitivities based on the first speech recognition sensitivity having a highest speech recognition success rate among the plurality of different speech recognition sensitivities at which the speech recognition success rate satisfies the first recognition success rate criterion.

4. The device of claim 1, wherein the first plurality of speech data comprises a set wake-up word and a natural language command, and wherein the speech recognition success rate of the pre-trained speech recognition model is determined by the processor based on the natural language command.

5. The device of claim 4, wherein the codes are configured to, when executed by the processor, further cause the processor to determine the speech recognition success rate of the pre-trained speech recognition model for each of the first plurality of speech data based on a recognition result of a set keyword in the natural language command.

6. The device of claim 1, wherein the codes are configured to, when executed by the processor, further cause the processor to:

obtain a second plurality of speech data input at different times after changing the setting of the speech recognition sensitivity based on the first speech recognition sensitivity corresponding to the first plurality of speech data;

apply the pre-trained speech recognition model to the second plurality of speech data at the plurality of different speech recognition sensitivities;

obtain a second speech recognition sensitivity from among the plurality of different speech recognition sensitivities based on the pre-trained speech recognition model and the plurality of different speech recognition sensitivities, the second speech recognition sensitivity corresponding to the optimal speech recognition sensitivity at which the speech recognition success rate of the pre-trained speech recognition model satisfies a set second recognition success rate criterion; and update the setting of the speech recognition sensitivity based on the second speech recognition sensitivity.

7. The device of claim 1, wherein the codes are configured to, when executed by the processor, further cause the processor to output a confirmation sound in response to recognition of a wake-up word included in the first plurality of speech data, and wherein a volume level of the confirmation sound is set based on a matching score of the wake-up word.

8. The device of claim 1, wherein the codes are configured to, when executed by the processor, further cause the processor to:

recognize a request in the first plurality of speech data to change a wake-up word of the device, and extract a new wake-up word from the first plurality of speech data including the request to change the wake-up word; and set the new wake-up word as the wake-up word of the device.

9. A device for changing a speech recognition sensitivity for speech recognition, comprising:

a processor; and a memory operatively coupled to the processor and configured to store at least one code executable by the processor, wherein the memory stores codes configured to, when executed by the processor, cause the processor to:

obtain a first plurality of speech data input at different times;

apply a pre-trained speech recognition model to the first plurality of speech data at a plurality of different speech recognition sensitivities;

obtain a first speech recognition sensitivity from among the plurality of different speech recognition sensitivities based on the pre-trained speech recognition model and the plurality of different speech recognition sensitivities, the first speech recognition sensitivity corresponding to an optimal speech recognition sensitivity at which a speech recognition success rate of the pre-trained speech recognition model satisfies a set first recognition success rate criterion;

change a setting of the speech recognition sensitivity based on the first speech recognition sensitivity obtained from among the plurality of different speech recognition sensitivities;

obtain a higher speech recognition sensitivity among the plurality of different speech recognition sensitivities that is higher than the optimal speech recognition sensitivity, in response to the speech recognition success rate of the pre-trained speech recognition model for a second plurality of speech data input after obtaining the optimal speech recognition sensitivity corresponding to the first plurality of speech data not satisfying the first recognition success rate criterion; and change the setting of the speech recognition sensitivity based on the higher speech recognition sensitivity.

10. A method for changing a speech recognition sensitivity for speech recognition of a device comprising a processor, the method comprising:

obtaining, by the processor, a first plurality of speech data input at different times;

applying, by the processor, a pre-trained speech recognition model to the first plurality of speech data at a plurality of different speech recognition sensitivities;

obtaining, by the processor, a first speech recognition sensitivity from among the plurality of different speech recognition sensitivities based on the pre-trained speech recognition model and the plurality of different speech recognition sensitivities, the first speech recognition sensitivity corresponding to an optimal speech recognition sensitivity at which a speech recognition success rate of the pre-trained speech recognition model satisfies a set first recognition success rate criterion;

changing, by the processor, a setting of the speech recognition sensitivity based on the first speech recognition sensitivity obtained from among the plurality of different speech recognition sensitivities;

identifying, by the processor, users associated with the first plurality of speech data;

obtaining, by the processor, a personal speech recognition sensitivity from among the plurality of different speech recognition sensitivities for each of the users based on the pre-trained speech recognition model and the plurality of different speech recognition sensitivities, the personal speech recognition sensitivity corresponding to the optimal speech recognition sensitivity; and
  changing, by the processor, the setting of the speech recognition sensitivity based on the personal speech recognition sensitivity of a corresponding current user of the device from among the users.

11. The method of claim 10, wherein the first speech recognition sensitivity is obtained based on the first speech recognition sensitivity having a highest speech recognition success rate among the plurality of different speech recognition sensitivities at which the speech recognition success rate satisfies the first recognition success rate criterion.

12. The method of claim 10, wherein the first plurality of speech data comprises a set wake-up word and a natural language command, and
  wherein the speech recognition success rate of the pre-trained speech recognition model is determined by the processor based on the natural language command.

13. The method of claim 12, wherein the determining the speech recognition success rate of the pre-trained speech recognition model comprises determining the speech recognition success rate of the pre-trained speech recognition model for each of the first plurality of speech data based on a recognition result of a set keyword in the natural language command.

14. The method of claim 10, further comprising:
  obtaining, by the processor, a second plurality of speech data input at different times after changing the setting of the speech recognition sensitivity based on the first speech recognition sensitivity corresponding to the first plurality of speech data;
  applying, by the processor, the pre-trained speech recognition model to the second plurality of speech data at the plurality of different speech recognition sensitivities;
  obtaining, by the processor, a second speech recognition sensitivity from among the plurality of different speech recognition sensitivities based on the pre-trained speech recognition model and the plurality of different speech recognition sensitivities, the second speech recognition sensitivity corresponding to the optimal speech recognition sensitivity at which the speech recognition success rate of the pre-trained speech recognition model satisfies a set second recognition success rate criterion; and
  updating, by the processor, the setting of the speech recognition sensitivity based on the second speech recognition sensitivity.

15. The method of claim 10, further comprising outputting, by the processor, a confirmation sound in response to recognition of a wake-up word included in the first plurality of speech data.

16. The method of claim 10, further comprising:
  recognizing, by the processor, a request in the plurality of speech data to change a wake-up word of the device, and extract a new wake-up word from the plurality of speech data including the request to change the wake-up word; and
  setting, by the processor, the new wake-up word as the wake-up word of the device.

17. The method of claim 10, further comprising:
  obtaining, by the processor, a higher speech recognition sensitivity among the plurality of different speech recognition sensitivities that is higher than the optimal speech recognition sensitivity, in response to the speech recognition success rate of the pre-trained speech recognition model for a second plurality of speech data input after obtaining the optimal speech recognition sensitivity corresponding to the first plurality of speech data not satisfying the first recognition success rate criterion; and
  changing, by the processor, the setting of the speech recognition sensitivity based on the higher speech recognition sensitivity.

* * * * *